United States Patent [19]

Parrish

[11] Patent Number: 5,074,656

[45] Date of Patent: Dec. 24, 1991

[54] BUOYANT EYEGLASS HOLDER APPARATUS

[76] Inventor: Walter L. Parrish, 310 E. 50th, Eugene, Oreg. 97405

[21] Appl. No.: 541,652

[22] Filed: Jun. 21, 1990

[51] Int. Cl.⁵ .................................................. G02C 3/00
[52] U.S. Cl. ...................................... 351/156; 351/157
[58] Field of Search ................ 351/123, 156, 157; 24/3 C; 2/452

[56] References Cited

U.S. PATENT DOCUMENTS 2,660,092  11/1953  Bloom ................................ 351/156
4,820,036  4/1989  Seet .............................. 351/157 X
5,015,085  5/1991  May ............................... 351/156 X Primary Examiner—Rodney B. Bovernick
Attorney, Agent, or Firm—Henderson & Sturm

[57] ABSTRACT

A buoyant eyeglass retainer apparatus (10) for suspending a pair of eyeglasses (100) at, or near, the surface of a body of water, including an elongated core member (15) fabricated from a material (16) having a positive buoyancy approximately equal to, or greater than, the negative buoyancy of the pair of eyeglasses wherein the core member (15) is operatively connected to the eyeglasses by a pair of eyeglass securing units (12).

3 Claims, 1 Drawing Sheet

U.S. Patent
Dec. 24, 1991
5,074,656
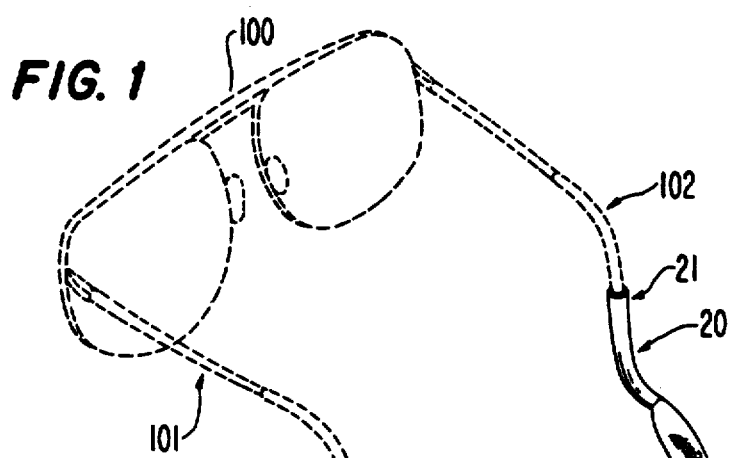
FIG. 1
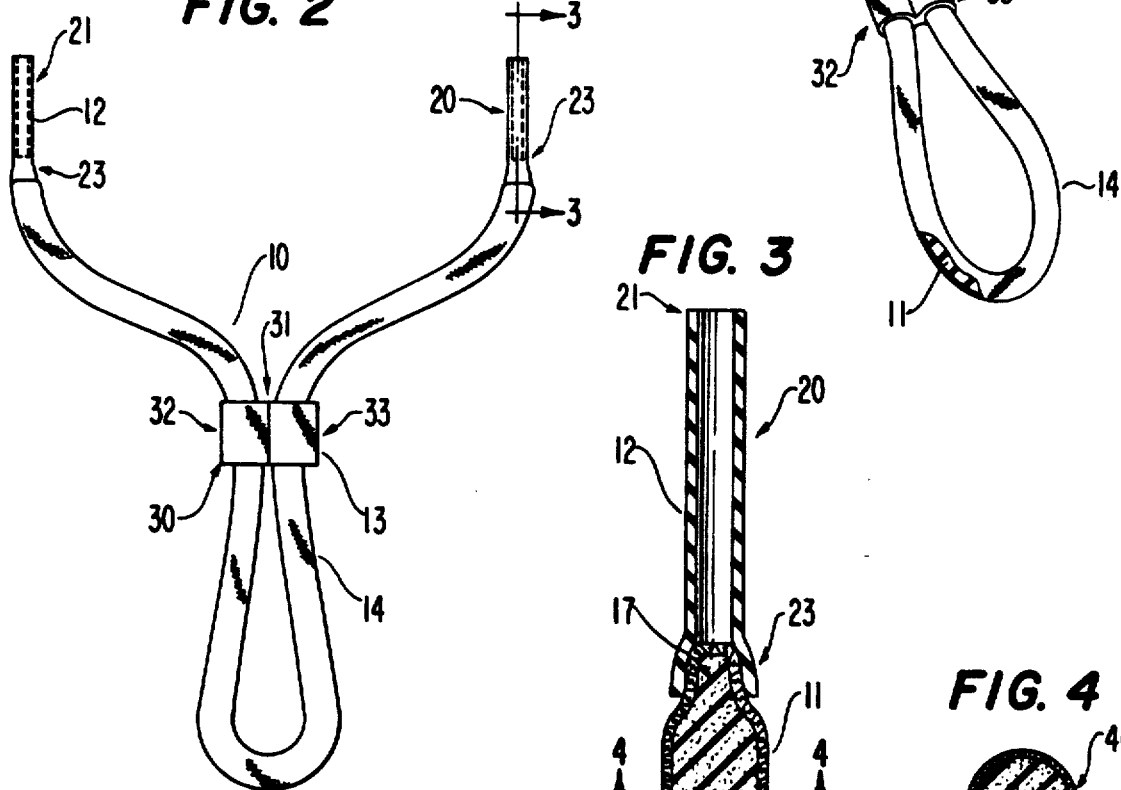
FIG. 2
FIG. 3
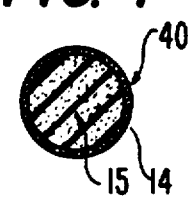
FIG. 4

BUOYANT EYEGLASS HOLDER APPARATUS

TECHNICAL FIELD

The present invention relates to the field of eyeglass holder devices in general, and in particular to an eyeglass holder having buoyant properties that will keep a pair of eyeglasses afloat if they are accidently dislodged from a user during water related activities.

BACKGROUND ART

As can be seen by reference to the following U.S. Pat. Nos. 3,874,776; 4,133,604; 4,541,696; and 4,696,566; the prior art is replete with myriad and diverse generally tubular eyeglass retainer devices.

While all of the aforementioned prior art constructions are more than adequate for the basic purpose and function for which they have been specifically designed, these previously patented retainer devices are uniformly deficient in the respect that they have failed to take into account the fact that many individuals are engaged in water related sport activities that not only conceivably, but quite often frequently, result in both the eyeglasses and the attached retainer device being consigned to the deep, and in those particular instances it is difficult, if not impossible to retrieve the eyeglasses and retainer even if the retainer itself is fabricated from material that has buoyant characteristics.

In addition, even in those instances wherein the materials from which the eyeglass retainers are fabricated do have a degree of buoyancy, the mass of material actually employed in the fabrication of the eyeglass retainers are not sufficient to overcome the weight of the eyeglasses to which the retainer is attached to maintain the retainer at, or near, the surface of the water. Obviously, this particular feature is of utmost importance when the surface of the water is rolled or the water is muddy or otherwise discolored.

As a consequence of the foregoing situation, there has existed a longstanding need among the public in general, and water sport enthuslasts in particular, for a buoyant eyeglass retainer apparatus that will virtually insure that the eyeglasses and retainer can be retrieved under even normally adverse conditions, and the provision of such a construction is a stated objective of the present invention.

DISCLOSURE OF THE INVENTION

Briefly stated, the buoyant eyeglass retainer apparatus that forms the basis of the present invention comprises a buoyant core unit, a pair of eyeglass securing units, an adjustment unit, and a fabric cover unit.

The buoyant core unit comprises an elongated generally cylindrical flotation member wherein the mass of material that forms the buoyant core unit is selected to offset the negative buoyancy of a conventional pair of eyeglasses whereby the flotation member has a buoyancy factor that is approximately equal to, or greater than the negative buoyancy of the eyeglasses whereby the core unit by itself is sufficient to maintain the eyeglasses at or near the surface of a body of water.

As will be explained in greater detail further on in the specification, the fabric cover unit serves a dual function in not only providing a decorative covering for the buoyant core unit, but also serving as an intermediate anchoring element that forms the operative connection between the buoyant core unit and the pair of eyeglass securing units that are provided on opposite ends of the apparatus.

In addition, the adjustment unit is designed to operatively engage the intermediate portion of the apparatus to provide a selectively snug fit between the apparatus, the eyeglasses and the user's head.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the apparatus engaged with a pair of eyeglasses;

FIG. 2 is an isolated perspective view of the apparatus;

FIG. 3 is a cross-sectional end view of the apparatus taken through line 3—3 of FIG. 2; and FIG. 4 is a cross-sectional side view of the end of the apparatus.

BEST MODE FOR CARRYING OUT THE INVENTION

As can be seen by reference to the drawings, and in particular to FIG. 1, the buoyant eyeglass holder apparatus that forms the basis of the present invention is designated generally by the reference numeral (10). The apparatus (10) comprises in general, a buoyant core unit (11), a pair of eyeglass securing units (12), an adjustment unit (13), and a cover unit (14).

As can best be seen by reference to FIGS. 1, 3, and 4, the buoyant core unit (11) comprises an elongated generally cylindrical core member (15) fabricated from a resilient buoyant material (16) such as closed cell foam, or the like, having a high positive buoyancy factor. In addition, the generally elongated cylindrical core member (15) is provided with tapered ends (17) whose purpose and function will be described in greater detail further on in the specification.

Turning now to FIGS. 2 and 4, it can be seen that the eyeglass securing unit (12) comprises a pair of relatively short, elasticized tubular securing members (20) which are adapted on one end (21) to be forceably enlarged to frictionally engage the free ends (102) of the temple arms (101) of a conventional pair of eyeglasses (100), and whose other ends (23) are adapted to be forceably enlarged to operatively engage the buoyant core unit (11) in a manner that will be explained in greater detail further on in the specification.

As shown in FIGS. 1 and 2, the adjustment unit (13) comprises an adjustment member (30) which slidably engages spaced portions of the core member (15) such that the core member (15) defines a loop on one side of the adjustment member (30) and two individual arms on the other side of the adjustment member (30).

In the preferred embodiment of the invention depicted in FIGS. 1 and 2, the adjustment member (30) comprises a strip (31) of material joined on its ends to form a closed loop wherein the intermediate portions of the strip (31) are joined together in a figure eight configuration to form a pair of capture loops (32, 33) and wherein each of the capture loops (32, 33) is dimensioned to accommodate the passage of the core member (15).

As can best be seen by reference to FIGS. 3 and 4, the cover unit (14) comprises a sleeve member (40) dimensioned to envelope the core member (15). The sleeve member (40) is manufactured from a fabric (41) capable of accepting bright colors, not only for the purpose of providing an aesthetically pleasing effect, but also for the purpose of enhancing the visibility of the apparatus (10) in rolled or muddy water conditions.

By referring to FIG. 4 in particular, it can be seen that in the preferred embodiment of the invention, the sleeve member (40) totally envelopes the core member (15), and the ends (23) of the securing members (20) are forceably enlarged and fixedly attached to the tapered ends (17) of the sleeve covered core member (15) to complete the assembly of the apparatus. It should also be noted that the engagement between the securing members (20) and the fabric covered core member (15) may be further enhanced by the application of adhesives, or the like, at the engaged interfaces.

As mentioned previously, the apparatus (10) that forms the basis of the present invention is specifically designed to counteract the negative buoyancy of a conventional pair of eyeglasses (100) in a marine environment and to that end, core member (15) that forms the buoyant core unit (11) is chosen to have a positive buoyancy approximately equal to, or greater than the negative buoyancy of the eyeglasses (100) such that the apparatus (10) while attached to the eyeglasses will float at or only slightly below, the water surface. In addition, in those instances where the apparatus (10) is suspended slightly below the surface of the water, the vibrant colors of the sleeve member (40) will facilitate the retrieval of the apparatus (10) and eyeglasses (100) by the user.

Having thereby described the subject matter of the present invention, it should be apparent that many substitutions and variations of the invention are possible in light of the above teachings. It is therefore to be understood that the invention as taught and described herein is only to be limited to the extent of the breadth and scope of the appended claims.

I claim:

1. A buoyant eyeglass retainer apparatus for use with a pair of eyeglasses having temple arms to suspend the eyeglasses at least in close proximity to the surface of a body of water; wherein, the apparatus comprises:

a buoyant core unit including an elongated generally cylindrical core member fabricated from a buoyant material having a positive buoyancy which is at least approximately equal to the negative buoyancy of the said eyeglasses;

a cover unit including a relatively thin elongated sleeve member which envelopes said core member; and, a pair of eyeglass securing units comprising relatively short lengths of elasticized tubular securing members having openings on both ends, one end being operatively secured to said core member and said sleeve member in a compressive fashion by forcing said one end onto and over part of the sleeve member; and, whose other end is adapted to releasably engage the temple arms of said eyeglasses.

2. The apparatus as in claim 1; further comprising:

an adjustment unit dimensioned to slideably receive spaced portions of the covered cylindrical core member.

3. The apparatus as in claim 2; wherein, the adjustment unit comprises two interconnected capture loops wherein each of the capture loops is dimensioned to slideably receive the covered core member.

* * * * *